United States Patent [19]
Senes et al.

[11] Patent Number: 5,354,104
[45] Date of Patent: Oct. 11, 1994

[54] FLEXIBLE COUPLING FOR PIPEWORK

[75] Inventors: René Senes, Merignac; Jean Lebrun, Le Bouscal, both of France

[73] Assignee: Techlam, Cedex, France

[21] Appl. No.: 4,927

[22] Filed: Jan. 15, 1993

[51] Int. Cl.⁵ .................... F16L 33/28; F16L 27/10
[52] U.S. Cl. ................... 285/235; 285/223; 285/298; 285/224
[58] Field of Search ............ 285/223, 226, 233, 224, 285/225, 234, 235, 298

[56] References Cited

U.S. PATENT DOCUMENTS

| | | | |
|---|---|---|---|
| 4,294,475 | 10/1981 | Kanai et al. | 285/223 |
| 4,438,957 | 3/1984 | Williams et al. | 285/223 |
| 4,593,941 | 6/1986 | Whightsil, Sr. | 285/223 |
| 4,706,998 | 11/1987 | Peppel et al. | 285/223 |
| 5,069,487 | 12/1991 | Sheppard | 285/226 |
| 5,106,129 | 4/1992 | Camacho et al. | 285/233 |
| 5,141,259 | 8/1992 | Highlen et al. | 285/223 |

FOREIGN PATENT DOCUMENTS

| | | | |
|---|---|---|---|
| 250104 | 10/1966 | Austria | 285/223 |
| 0002071 | 5/1979 | European Pat. Off. | |
| 1088906 | 9/1960 | Fed. Rep. of Germany | |
| 2673698 | 9/1992 | France | |
| 2035497 | 6/1980 | United Kingdom | |
| 2074687 | 11/1981 | United Kingdom | |

*Primary Examiner*—Eric K. Nicholson
*Attorney, Agent, or Firm*—Weingarten, Schurgin, Gagnebin & Hayes

[57] ABSTRACT

A flexible coupling for pipework comprises a rigid sleeve of circular section engaged coaxially around the ends of pipes to be coupled together and connected to each of said ends in sealed manner by means of respective annular gaskets of flexible and resilient material received coaxially in each of the annular gaps between the ends of the pipe and the ends of the sleeve. The sleeve is made up of an assembly of three rigid tubes in alignment along the same longitudinal axis and assembled together in sealed manner by connection means comprising annular gaskets analogous to the above-mentioned annular gaskets and by two sets of laminated blocks which hold the tubes rigidly in alignment on the longitudinal axis, but which allow limited amplitude mutual displacements thereof with resilient return along the axis and around the axis.

8 Claims, 3 Drawing Sheets

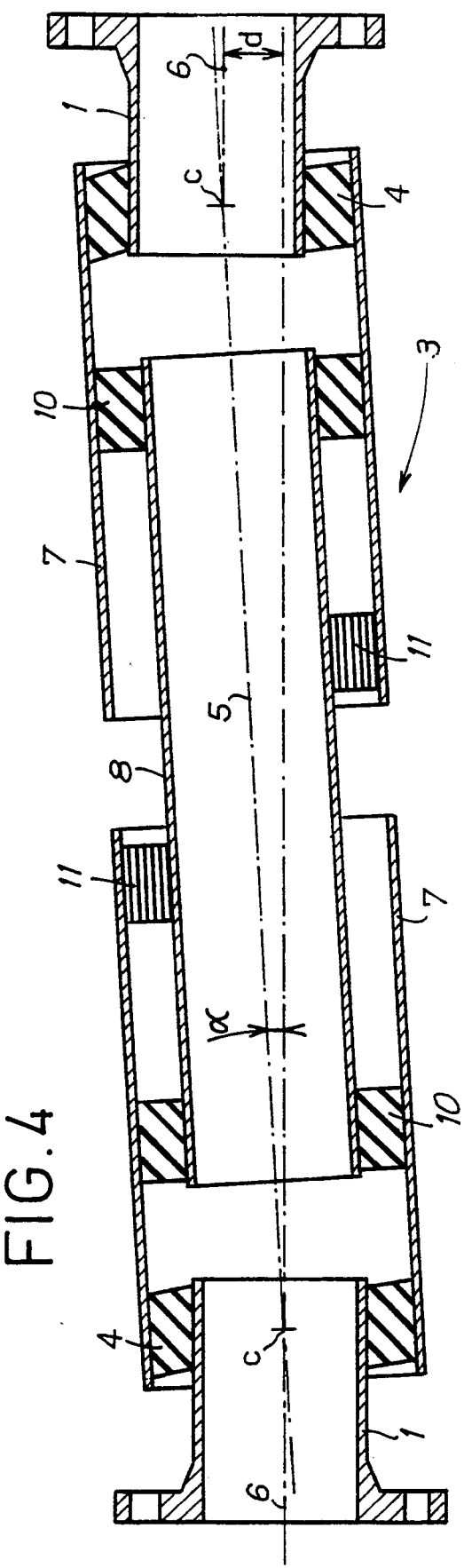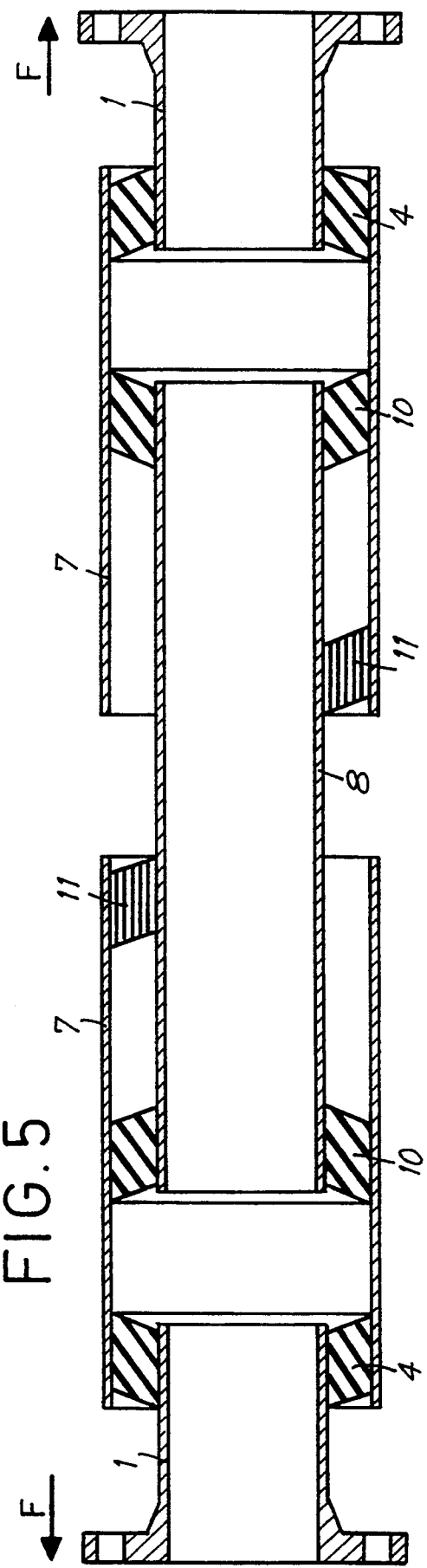

FLEXIBLE COUPLING FOR PIPEWORK

The present invention relates to a flexible coupling for pipework, the coupling comprising a rigid sleeve of circular section engaged coaxially around the ends of the pipes to be coupled, and connected to each of them in sealed manner by respective annular gaskets of flexible and resilient material received coaxially in the corresponding annular gaps between the ends of the pipes and respective ends of the sleeve. The above-mentioned section of the sleeve refers to the section of its internal passage for fluid, in the hydraulic sense.

BACKGROUND OF THE INVENTION

Flexible couplings of this kind enable the two pipe ends between which they are interposed to move axially and radially relative to each other so that pipework fitted with such a flexible coupling enables hydraulic coupling to be achieved between two objects that move relative to each other.

The devices used at present for making couplings of this type are generally made either of rubber or elastomer, or else entirely of metal. The first category includes flexible loops that take up space and give rise to head losses, flexible sleeves that take up little space but are generally limited as to pressure, and reinforced flexible membranes which withstand high pressures but are suitable for use with relative movement that is axial only, and which are poorly adapted to pipework of small diameter. The second category includes metal bellows, loops, or various configurations of bends, operating by elastic deformation of the metal, and suffering from drawbacks analogous to those mentioned above for flexible loops and for sleeves, while being less effective in attenuating vibrations transmitted by the pipework.

SUMMARY OF THE INVENTION

To remedy these drawbacks, the present invention provides a flexible coupling of the kind specified above, in which the sleeve is constituted by at least one assembly of tubes made up of rigid tubes in alignment along a common longitudinal axis and assembled together in sealed manner by connection means ensuring that they are held rigidly in alignment along said axis, but allowing them limited amplitude mutual displacements with resilient return in the direction of said axis.

A flexible coupling having such a structure has no loops and no flexible sleeves, and as a result it gives rise to a small amount of head loss only, and it is capable of withstanding high pressures. It takes up little room in the transverse direction in comparison with the large volume occupied by prior art bend configurations. In addition, the above-mentioned connection means between the tubes provide good attenuation of vibration because of their resilient flexibility, and as a result the propagation of vibration is impeded on each occasion it passes from one tube to the next.

In a preferred embodiment, the above-mentioned assembly of tubes comprises three tubes, namely two end tubes spaced apart along the axis, and an intermediate tube of different diameter bridging the gap between the two end tubes; as for the connection means between the tubes, they comprise between two consecutive tubes: an annular gasket of flexible and resilient material plus a set of laminated blocks (e.g. three or four blocks) regularly spaced apart around said axis, each block being made up of rigid layers and of flexible and resilient layers that are superposed in alternation, the layers being in the form of cylindrical surfaces centered on said axis, said annular gasket and said set of laminated blocks being inserted side by side in the gap between the two tubes that they connect together, and being fixed to the respective facing surfaces thereof.

A coupling made in this way allows deformation to take place in all six degrees of freedom since it accepts three modes of deformation: axial deformation; twisting deformation; and bending deformation. Bending, which occurs only at the annular gaskets, may be considered as being rotation about the center of each annular gasket, providing the width thereof is small enough relative to its diameter to enable it to be treated as a portion of a sphere. The two sets of laminated blocks while allowing only two centers of rotation in all serve to avoid the flexible coupling buckling under pressure.

Advantageously, the intermediate tube is smaller in radius than the end tubes, and is partially engaged inside them. In which case, the section of the intermediate tube should be identical to that of the pipework for which the coupling is designed, so as to maintain the uniformity of the pipework including the coupling as closely as possible, thereby reducing the head losses induced by the coupling. For the same purpose, the annular gaskets interconnecting said tubes are advantageously disposed at the ends of the intermediate tube. In addition, membranes or socks may be provided to provide good continuity for the flow through the flexible coupling, thereby avoiding head losses therein.

The annular gaskets are preferably fixed around their entire outer periphery and around their entire inner periphery to the surfaces of the tubes between which they are disposed, thereby ensuring firm and sealed connection between the annular gaskets and the tubes. Such a connection can be obtained merely by clamping, thereby setting up sufficient friction forces to ensure both adhesion and sealing, or it may be obtained by use of an adhesive. However, best results in this respect are obtained when the annular gaskets are made of rubber or of elastomer and are fixed to said surfaces by rubber bonding obtained by vulcanizing the raw rubber or elastomer in contact with the surfaces of the tubes, which surfaces are appropriately-treated metal surfaces.

The beneficial effects of the above-defined sleeve are increased when the sleeve comprises not just one, but a plurality of assemblies of three tubes disposed in series along a common axis, with two consecutive assemblies being connected together by fastening together their adjacent end tubes.

Because of its judicious assembly of flexible elements and of rigid elements, the flexible coupling of the invention as defined above provides both sealing and flexibility while giving rise to small amounts of head loss only. In addition, it is capable of withstanding high internal pressures and of attenuating the transmission of vibration emitted by one or the other of the objects or components that are hydraulically interconnected by the pipework in which it is included. Applications for the coupling exist, in particular, in shipbuilding, in off-shore installations, etc., where it is particularly suitable for establishing pipework that connects fixed structures to structures that are suspended or floating.

BRIEF DESCRIPTION OF THE DRAWINGS

Embodiments of the invention are described by way of example with reference to the accompanying drawings, in which:

FIGS. 4 and 5 are similar to FIG. 1 and they show the flexible coupling respectively when subjected to a transverse offset and to axial elongation.

DETAILED DESCRIPTION

Figure 1:
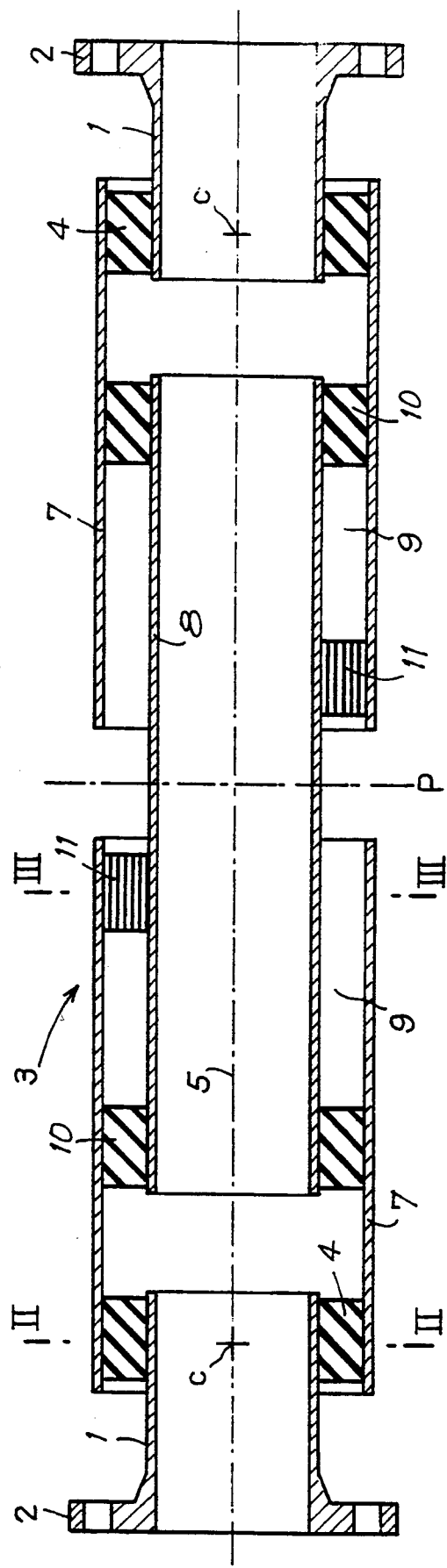
FIG. 1 is a diagrammatic axial section through a flexible coupling of the invention.
Figure 2:
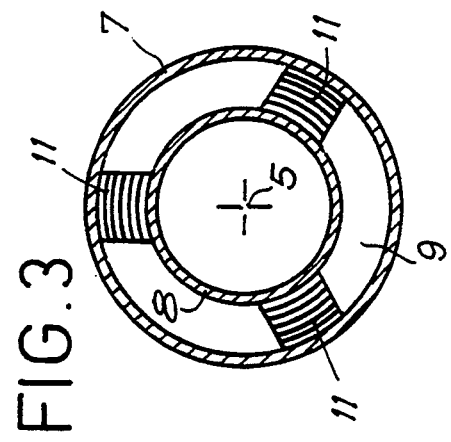
FIGS. 2 and 3 are cross-sections through the coupling of FIG. 1 respectively on lines II—II and III—III.

The flexible coupling shown in FIG. 1 comprises two tubular endpieces 1 fitted with respective flanges 2 for coupling to pipework (not shown) and each connected in sealed manner to a sleeve 3 whose ends are engaged on the endpieces via interposed annular gaskets 4 of flexible and resilient material, the gaskets filling the gaps that exist between each of the ends of the sleeve 3 and the corresponding endpiece 1.

As explained below, although made up of a plurality of elements that are not held fast relative to one another, the sleeve 3 constitutes a rigid structure that prevents bending or lateral curving and that maintains a rectilinear configuration along the direction of its own axis 5.

The annular gaskets 4 that provide sealed flexible connection between the endpieces 1 and the sleeve 3 are made of rubber and are fixed to the metal surfaces of the assembly by rubber bonding, which method of fixing has the advantage of providing a connection that is continuous and extremely strong. When the pipework is subjected to stresses at the flexible coupling, the gasket 4 of at least one of the endpieces 1 deforms so as to allow the sleeve 3 to move angularly relative to said endpiece (FIG. 4), which displacement can be considered as being a rotation through an angle $\alpha$ about the center C of the angular gasket 4, such that the axis 5 of the sleeve is no longer in alignment with the axis 6 of the endpiece 1.

Thus, the flexible coupling imparts to the pipework both the possibility of bending (about one or both of the centers C), and of having a lateral offset (by bending equally but in opposite directions about both centers C), thereby enabling a lateral offset d to be obtained, as shown in FIG. 4. In addition, by subjecting the gaskets 4 to shear deformation, either axially, or circumferentially, the flexible coupling imparts a certain latitude to the pipework both in twisting about the axis and in extension or contraction in the axial direction.

In order to increase the capabilities of the flexible coupling in twisting and in axial elongation, the sleeve 3 is not made as a single piece, but is constituted by an assembly of three tubes 7, 8, and 7. These are rigid metal tubes whose axes coincide with the axis 5 of the sleeve 3. The tubes are fitted together telescopically, and they are assembled together in sealed manner by means of resilient connection elements that provide the composite sleeve 7, 8, 7 with transverse stiffness, i.e. that prevent it from curving, but that allow small displacements to take place between the tubes both in translation along the axis 5 and in rotation about said axis. The two tubes 7 forming the ends of the sleeve 3 are identical, with the third tube 8 constituting an intermediate tube which interconnects the two end tubes 7 via the above-mentioned resilient elements. The end tubes are larger in diameter than the intermediate tube 8 which has the same diameter as the endpieces 1. The intermediate tube is engaged over equal lengths in each of the tubes 7 which are spaced apart mutually, and spacing is also ensured between the ends of the tube 8 and the endpieces 1 so as to prevent them from striking one another when the flexible coupling deforms.

Figure 3:
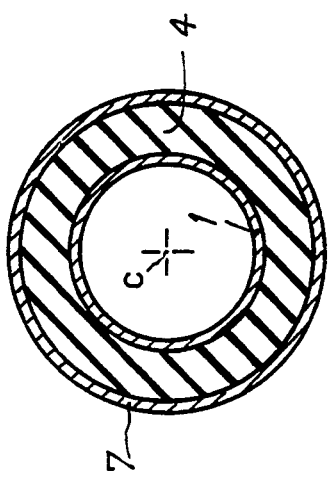

The resilient elements connecting the tube 8 to each of the tubes 7 are received in the annular gap 9 between said tubes. They comprise an annular gasket 10 similar to the above-described gaskets 4 and similarly fixed by rubber bending, thereby ensuring that the connection is sealed, plus a set of three laminated blocks 11 that are distributed at 120° intervals around the axis 5 (FIG. 3). These blocks are made up of stacks of layers that are alternately rigid and flexible, and that are curved to occupy circularly cylindrical surfaces around the axis 5. Since the axial stiffness of such blocks is low, they enable the tubes 7 and 8 to move relative to each other along the axis 5 and also around said axis; however since they are stiff in the radial direction, they prevent any lateral displacement and any bending between the two tubes they interconnect. As a result, they keep the tubes in rigid alignment along the axis 5. The two sets of laminated blocks 11 disposed between the intermediate tube 8 and the two end tubes 7 thus ensure that the sleeve 3 constituted by said tubes is rigid.

However, these laminated blocks 11 provide no opposition, any more than do the annular gaskets 10 that are interposed between the tube 8 and the two tubes 7, to relative displacements therebetween both in the axial direction (extension or compression of the sleeve) and in the circumferential direction (twisting of the sleeve) which displacements add to the similar displacements allowed by the two annular gaskets 4 interposed between the tubes 7 and the endpieces 1, thereby substantially doubling the effects thereof. Thus, FIG. 5 shows the coupling when extended under the effect of axial traction force F applied thereto, this giving rise to shear deformations of the two pairs of solid annular gaskets 4, 10 and to the pair of sets of laminated blocks 11 interconnecting the five tubular elements 1, 7, 8, 7, and 1 of the coupling.

Because the intermediate tube 8 and the endpieces 1 all have the same inside diameter as the pipework which includes the flexible coupling, and because the annular gaskets 4 and 10 are all placed at corresponding ends of the endpieces 1 and of the tube 8, the discontinuities inserted in the pipework by the flexible couplings are reduced to a minimum, thereby leading to low head losses.

Figure 6:
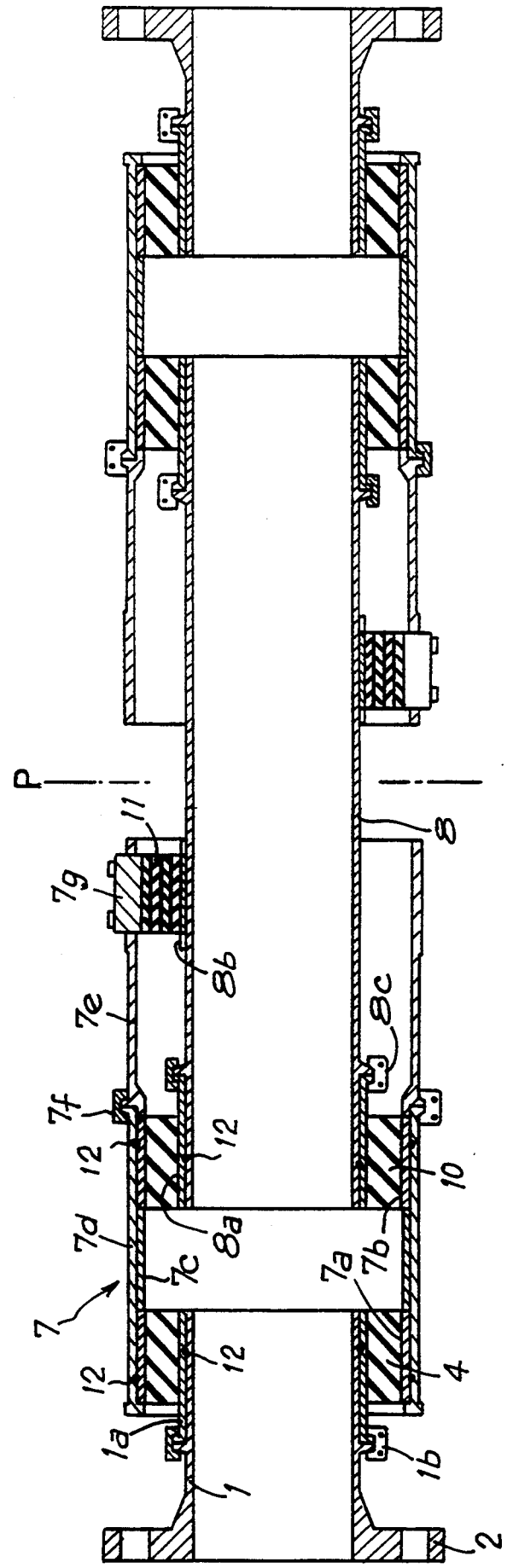
FIG. 6 is a detailed axial section through a concrete embodiment of a FIG. 1 flexible coupling.

In a concrete embodiment shown in FIG. 6, the endpiece 1 is surrounded by a bush 1a which is held in place by a collar 1b that clamps together adjacent ribs belonging respectively to the endpiece 1 and to the bush 1a. The bush 1a is rubber bonded to the annular gasket 4 whose outside is bonded to a bush 7a. Similarly, the inside of the annular gasket 10 is bonded to a bush 8a and its outside to a bush 7b. A cylindrical spacer 7c is disposed between the bushes 7a and 7b, with these three tubular members 7a, 7c, and 7b all having the same diameter and being surrounded by a tubular part 7d which co-operates with a same diameter tubular part 7e that extends it to form the above-mentioned tube 7. The parts 7d and 7e are held in mutual abutment by means of a collar 7f clamping together adjacent ribs belonging to said parts, with said parts then clamping together the parts 7a and 7b and the spacer 7c by means of rims provided for this purpose so that said parts are engaged inside the part 7d and are prevented from moving axially relative thereto. At the end of the part 7e furthest from the part 7d, three rectangular openings are formed at 120° intervals and three bases 7g are engaged and fixed therein, said bases being rubber bonded to three respective laminated blocks 11. Each of these blocks also rests on the outside surface of the tube 8 and is positioned thereon by means of a rectangular frame 8b which is fixed to said surface and which follows the cylindrical shape thereof. In addition, the above-mentioned bush 8a is connected to the corresponding end of the tube 8 by means of a collar 8c that clamps together adjacent ribs belonging respectively to the bush 8a and to the tube 8. In order to obtain a joint that is completely sealed relative to the outside between the endpiece 1 and the tube 8, sealing rings 11 are inserted between the endpiece 1 and the bush 1a, between the bush 7a and the part 7d, between the part 7d and the bush 7b, and between the bush 8a and the tube 8.

The portion of the coupling situated to the right of the midplane P in FIG. 6 is identical to the portion on the left as described in detail above, and is not further described in order to avoid repetition.

As can be seen in FIG. 6, the coupling constituted in this way has the advantage of being fully contained within a diameter that is no greater than the outside diameter of the end flanges 2 corresponding to the nominal diameter of the pipework for which the coupling is designed, and this is achieved by using collars for connecting together the various component elements thereof.

Figure 7:
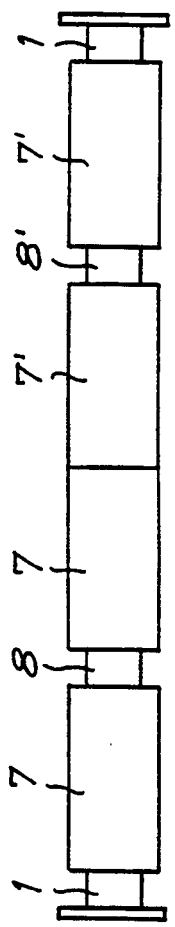
FIG. 7 is a diagram on a smaller scale showing a variant embodiment.

If it is desired to increase the facility for extension and for twisting of a flexible coupling having a composite sleeve 3, it is possible to make up the sleeve from a plurality of three-tube assemblies 7, 8, 7 made up as described above. Thus, the sleeve may comprise two identical assemblies constituted by respective pairs of end tubes 7 and 7 and 7' and 7', interconnected by respective intermediate tubes 8 and 8' (FIG. 7), with the assemblies themselves being assembled in line by their facing end tubes being secured together, which end tubes may optionally be constituted by a single part.

We claim:

1. A flexible coupling for pipework, the coupling comprising a sleeve assembly for circular section coaxially engaged around the ends of the pipes to be coupled together, and being connected to each of them in sealed manner by means of respective annular gasket of flexible and resilient material that are received coaxially in corresponding annular gaps between said ends and respective ends of the sleeve assembly, said sleeve assembly being constituted by at least one assembly of rigid tubes in alignment on the same longitudinal axis and assembled together in sealed manner by connection means which hold them in alignment along said axis, but which allow them limited amplitude mutual displacement along said axis, said at least one assembly of rigid tubes comprising two end tubes spaced apart along the axis and an intermediate tube of different diameter that bridges a gap between the two end tubes, with the connection means between the tubes comprising, between two consecutive tubes, an annular gasket of flexible and resilient material; wherein said connection means are designed to provide resiliency along the above-mentioned axis and further include a set of laminated blocks regularly distributed around said axis, each of the blocks being made up of alternating superposed layers that are rigid and layers that are flexible and resilient, the layers being in the form of cylindrical surfaces centered on said axis, said annular gasket and said set of laminated blocks being inserted side by side in the gap between the two tubes that they connect together, and being fixed to respective facing surfaces belonging to said tubes.

2. A coupling according to claim 1, wherein the intermediate tube is smaller in radius than the end tubes, and is partially engaged inside them.

3. A coupling according to claim 2, wherein the intermediate tube is identical in section to pipes of the coupling.

4. A coupling according to claim 1, wherein the annular gaskets connecting said tubes together are disposed at the ends of the intermediate tube.

5. A coupling according to claim 1, wherein the annular gaskets are fixed around their entire outer periphery and their entire inner periphery to the surfaces of the tubes between which they are interposed.

6. A coupling according to claim 5, wherein the annular gaskets are made of rubber or of elastomer and are fixed to said surfaces by rubber bonding.

7. A coupling according to claim 1, wherein the number of laminated blocks in each of said sets is three or four.

8. A coupling according to claim 1, wherein the sleeve comprises a plurality of assemblies of three tubes disposed in series along a common axis, two consecutive assemblies being connected together by securing end tubes thereof together.

* * * * *

UNITED STATES PATENT AND TRADEMARK OFFICE
CERTIFICATE OF CORRECTION

PATENT NO. : 5,354,104
DATED : October 11, 1994
INVENTOR(S) : Rene Senes et al.

It is certified that error appears in the above-indentified patent and that said Letters Patent is hereby corrected as shown below:

On the title page, item [75]: "Jean Lebrun, Le Bouscal" should read --Jean Lebrun, Le Bouscat--.

Column 5, line 20, "sealing rings 11" should read --sealing rings 12--.

Column 6, line 15, "material; wherein" should read

--material;
    wherein-- [new paragraph].

Signed and Sealed this

Fifth Day of September, 1995

Attest:

BRUCE LEHMAN

Attesting Officer

Commissioner of Patents and Trademarks